(12) United States Patent
Kwon (10) Patent No.: US 11,432,298 B2
(45) Date of Patent: Aug. 30, 2022

(54) COMMUNICATION DEVICE AND METHOD OF OPERATION THEREOF

(71) Applicant: SOLiD, INC., Seongnam-si (KR)

(72) Inventor: Nagwon Kwon, Gyeonggi-do (KR)

(73) Assignee: SOLiD, INC., Seongnam-si (KR)

( * ) Notice: Subject to any disclaimer, the term of this patent is extended or adjusted under 35 U.S.C. 154(b) by 88 days.

(21) Appl. No.: 17/103,442

(22) Filed: Nov. 24, 2020

(65) Prior Publication Data

US 2021/0160887 A1 May 27, 2021

(30) Foreign Application Priority Data

Nov. 25, 2019 (KR) .................. 10-2019-0152486
Nov. 24, 2020 (KR) .................. 10-2020-0158906

(51) Int. Cl.
*H04W 24/02* (2009.01)
*H04B 7/155* (2006.01)
*H04W 72/08* (2009.01)

(52) U.S. Cl.
CPC ......... *H04W 72/082* (2013.01); *H04W 24/02* (2013.01); *H04B 7/15585* (2013.01)

(58) Field of Classification Search
CPC . H04W 72/082; H04W 24/02; H04W 52/243; H04W 52/143; H04W 52/04; H04W 52/54; H04B 3/32; H04B 7/0626; H04B 7/15585; H04B 17/24; H04B 7/0417; H04B 17/345; H04B 7/0619; H04B 15/02; H04B 1/1081; H04B 1/109; H04B 10/58; H04B 1/0475; H04B 1/525
See application file for complete search history.

(56) References Cited

U.S. PATENT DOCUMENTS

2011/0170473 A1 7/2011 Proctor, Jr. et al.
2015/0030098 A1 1/2015 Ljung et al.
(Continued)

FOREIGN PATENT DOCUMENTS

EP 2 787 651 A1 10/2014
EP 2 787 651 B1 5/2017
(Continued)

OTHER PUBLICATIONS

Office Action dated Nov. 2, 2021 in Japanese Application No. 2020-195448.
(Continued)

*Primary Examiner* — Daniel Lai
(74) *Attorney, Agent, or Firm* — Sughrue Mion, PLLC (57) ABSTRACT

A method of operating a communication device including a processor and a memory, the method comprises feeding back a downlink communication signal subjected to analog signal processing, generating signal modification information according to a comparison result of the fed-back downlink communication signal and a downlink communication signal before the analog signal processing, generating an interference cancellation signal for canceling interference occurring in an uplink communication signal by the downlink communication signal based on the generated signal modification information and canceling interference occurring in the uplink communication signal by using the generated interference cancellation signal.

15 Claims, 6 Drawing Sheets

(56) References Cited

U.S. PATENT DOCUMENTS

| | | |
|---|---|---|
| 2017/0180160 A1 | 6/2017 | Moorti et al. |
| 2018/0175894 A1 | 6/2018 | Utsunomiya |
| 2019/0052381 A1* | 2/2019 | Abdelmonem ......... H04L 25/08 |
| 2020/0412519 A1* | 12/2020 | Krishnaswamy .... H04B 7/0617 |
| 2021/0127284 A1* | 4/2021 | Abdelmonem ..... H04L 27/0008 |

FOREIGN PATENT DOCUMENTS

| | | | |
|---|---|---|---|
| EP | 3254378 B1 * | 12/2018 | ............ H04B 1/525 |
| EP | 3 509 223 A1 | 7/2019 | |
| JP | 2018-101856 A | 6/2018 | |

OTHER PUBLICATIONS

Extended European Search Report dated Apr. 1, 2021 in European Application No. 20209760.6.

* cited by examiner

COMMUNICATION DEVICE AND METHOD OF OPERATION THEREOF

CROSS-REFERENCE TO RELATED APPLICATIONS

This application claims the benefits of Korean Patent Applications No. 10-2019-0152486, filed on Nov. 25, 2019, and No. 10-2020-0158906, filed on Nov. 24, 2020, in the Korean Intellectual Property Office, the disclosures of which are incorporated herein in their entireties by reference.

BACKGROUND

1. Field

The disclosure relates to communication devices and methods of operation thereof, and more particularly, to communication systems capable of generating an interference cancellation signal by feeding back a downlink communication signal subjected to analog signal processing and reflecting signal modification information of the fed-back downlink communication signal, and methods of operation thereof.

The disclosure is based on the results of "Development of 5G DAS technology of multi-band, multi-service, and multi-interface supporting open fronthaul interface (O-RAN) (Task No. 2019-0-00036)".

2. Description of the Related Art

In a distributed antenna system, intermodulation (IM) distortion may occur due to passive elements such as antennas and distributors.

In particular, when the distributed antenna system provides a multi-band service, IM distortion may occur more frequently, and a nonlinear characteristic may occur in a passive element in an uplink band by a downlink communication signal.

SUMMARY

Provided are communication systems capable of generating an interference cancellation signal by feeding back a downlink communication signal subjected to analog signal processing and reflecting signal modification information of the fed-back downlink communication signal, and methods of operation thereof.

According to an aspect of an embodiment, a method of operating a communication device including a processor and a memory may comprise feeding back a downlink communication signal subjected to analog signal processing, generating signal modification information according to a comparison result of the fed-back downlink communication signal and a downlink communication signal before the analog signal processing, generating an interference cancellation signal for canceling interference occurring in an uplink communication signal by the downlink communication signal based on the generated signal modification information and canceling interference occurring in the uplink communication signal by using the generated interference cancellation signal.

According to an aspect of an embodiment, the interference may be passive intermodulation (PIM).

According to an aspect of an embodiment, the feeding back of the downlink communication signal subjected to analog signal processing may comprise feeding back a downlink communication signal input to a distributor for distributing the downlink communication signal subjected to analog signal processing to an antenna of the communication device.

According to an aspect of an embodiment, the feeding back of the downlink communication signal subjected to analog signal processing may comprise feeding back a downlink communication signal output from a distributor for distributing the downlink communication signal subjected to analog signal processing to an antenna of the communication device.

According to an aspect of an embodiment, the generating of the signal modification information may comprise converting the fed-back downlink communication signal into a frequency domain, calculating a correlation between the fed-back downlink communication signal converted into the frequency domain and a downlink communication signal before the analog signal processing, and generating the signal modification information based on the calculated correlation.

According to an aspect of an embodiment, the signal modification information may include at least one of signal flatness and group delay.

According to an aspect of an embodiment, the generating of the interference cancellation signal may comprise compensating for a signal change of a downlink communication signal before the analog signal processing based on the signal modification information, and generating the interference cancellation signal using the downlink communication signal for which the signal change is compensated.

According to an aspect of an embodiment, the compensating for the signal change of the downlink communication signal may comprise compensating for a value corresponding to the inverse of the signal modification information with respect to the downlink communication signal.

According to an aspect of an embodiment, the compensating for the signal change of the downlink communication signal may comprise compensating for signal flatness and group delay using a finite impulse response (FIR) filter.

According to an aspect of an embodiment, the method of operating a communication device may further comprise detecting a frequency band in which interference has occurred.

According to an aspect of an embodiment, the feeding back of the downlink communication signal subjected to analog signal processing may comprise selectively feeding back a downlink communication signal subjected to analog signal processing for the frequency band in which interference has occurred.

According to an aspect of an embodiment, the canceling of interference occurring in the uplink communication signal may comprise selectively canceling interference occurring in the uplink communication signal for the frequency band in which interference has occurred.

According to an aspect of an embodiment, the communication device may be a remote device included in a distributed antenna system.

According to an aspect of an embodiment, the method of operating a communication device may be digitally processed in the remote device.

According to another aspect of an embodiment, a communication device including a processor and a memory may comprise a signal modification information generator configured to feed back a downlink communication signal subjected to analog signal processing and to generate signal modification information according to a comparison result of the fed-back downlink communication signal and a downlink communication signal before the analog signal processing, an interference cancellation signal generator configured to generate an interference cancellation signal for canceling interference occurring in an uplink communication signal by the downlink communication signal based on the generated signal modification information, and an interference canceler configured to cancel interference occurring in the uplink communication signal by using the generated interference cancellation signal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Figure 1:
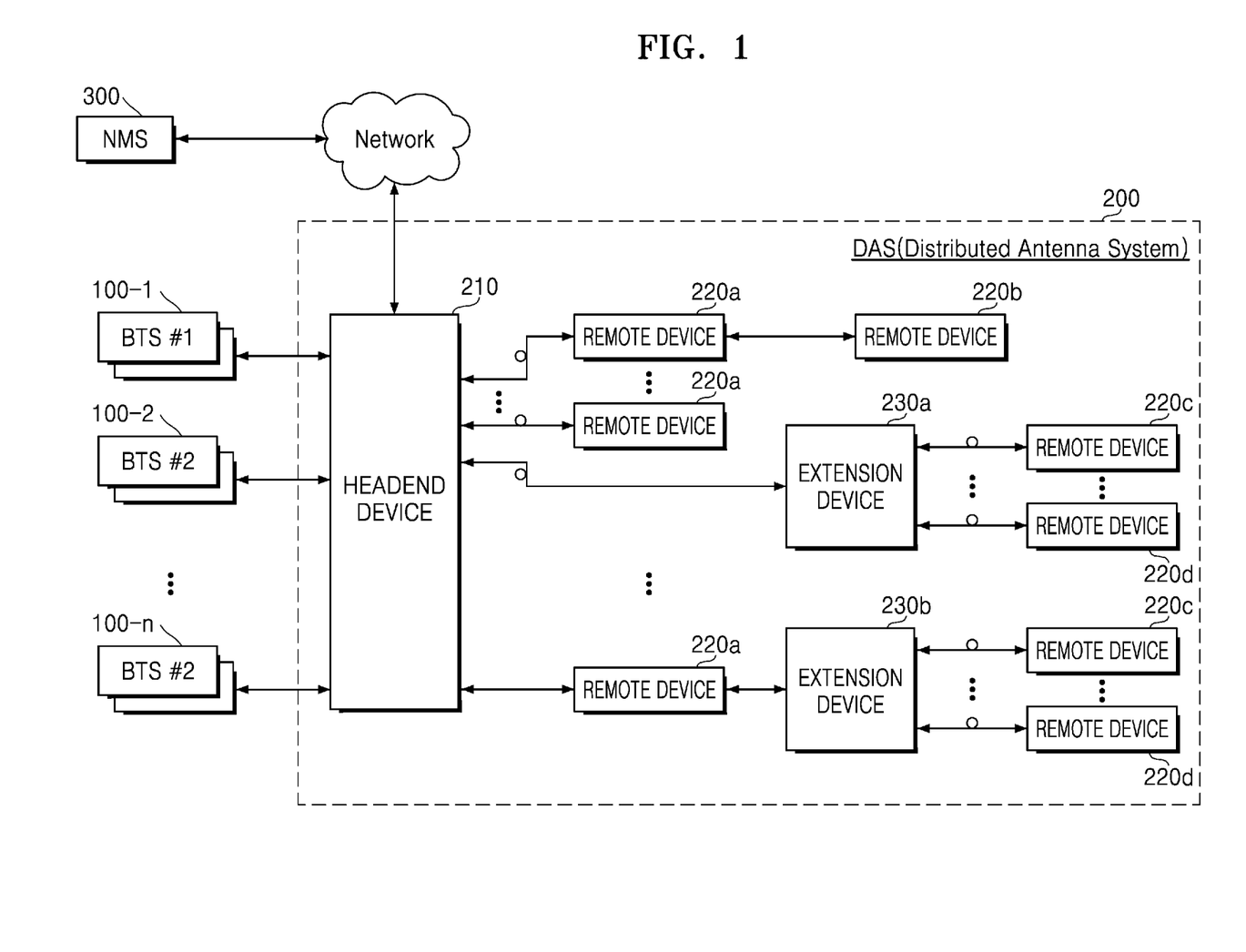
FIG. 1 is a conceptual diagram of a communication system according to an embodiment.

FIG. 1 is a conceptual diagram of a communication system 10 according to an embodiment.

Referring to FIG. 1, a distributed antenna system (DAS) 200 may include a headend device 210 that constitutes a headend node and is communicatively connected to a plurality of base transceiver stations (BTS) 100-1 to 100-$n$, a plurality of remote devices 220*a*, 220*b*, 220*c*, and 220*d* that constitute a remote node and are connected to another remote node or communicatively connected to a user terminal by being arranged at each remote service location, and extension devices 230*a* and 230*b* that constitute an extension node.

In FIG. 1, the DAS 200 is shown as a system separated from the plurality of BTS 100-1 to 100-$n$, but according to an embodiment, the DAS 200 may be configured as a portion of a base station, and may broadly mean a system configured by distributing antennas in order to extend coverage of the base station.

When the DAS 200 is configured as a portion of the base station, a headend device (e.g., 210) may be omitted. In addition, a remote device (e.g., 220*a*, 220*b*, 220*c*, or 220*d*) may be referred to in various terms such as an active antenna unit (AAU) or O-RU (Optical-Remote Unit), and the base station may be configured in a form including a distributed unit (DU) and a centralized unit (CU).

Each of the headend device 210, the plurality of remote devices 220*a*, 220*b*, 220*c*, and 220*d*, and the expansion devices 230*a*, 230*b* may constitute a communication node for transmitting communication signals within the DAS.

According to an embodiment, the DAS 200 may be implemented as an analog DAS.

According to another embodiment, the DAS 200 may be implemented as a digital DAS, and in some cases may be implemented in a hybrid type (e.g., in the form of analog processing for some nodes and digital processing for other nodes).

According to another embodiment, the DAS 200 may include some configurations of the plurality of BTS 100-1 to 100-$n$ or may perform some functions of the plurality of BTS 100-1 to 100-$n$.

Meanwhile, FIG. 1 shows an example of a topology of the DAS 200 and various modifications are possible in the DAS 200 considering specificity of installation areas and application fields (e.g., in-building, a subway, a hospital, a stadium, etc.). For example, the number of the headend device 210, the remote devices 220*a*, 220*b*, 220*c*, and 220*d*, and the extension devices 230*a* and 230*b*, and a connection relationship between upper and lower ends thereof may be different from FIG. 1.

In this specification, 'upper' may refer to a side that receives and processes a communication signal relatively first based on the flow of a communication signal, and 'lower' may refer to a side that receives and processes a communication signal relatively later based on the flow of a communication signal. According to an embodiment, in downlink communication and uplink communication in which the flow directions of communication signals are opposite to each other, the directions of 'upper' and 'lower' may be different from each other.

The extension devices 230a and 230b in the DAS 200 may be utilized when the number of branches of the headend device 210 is limited compared to the number of remote devices to be installed.

Each node in the DAS 200 and its function will be described in more detail. First, the headend device 210 may serve as an interface with a base station. FIG. 1 shows that the headend device 210 is connected to the plurality of BTS 100-1 to 100-n (where n is a natural number of 2 or more).

According to an embodiment, the headend device 210 may be implemented with a main headend device and a sub headend device, and may be connected to a base station for each service frequency band of a specific service provider or a base station for each sector. In some cases, the main headend device may compensate for coverage by the sub headend device.

In general, because a radio frequency (RF) signal received from a base station is a high-power signal, the headend device 210 may attenuate such a high-power RF signal into a signal of power suitable for processing at each node. The headend device 210 may lower a high-power RF signal for each frequency band or for each sector to a low-power RF signal. The headend device 210 may be coupled with the low-power RF signal and may distribute the coupled signal to the extension device 230a or the remote device 220a.

According to an embodiment, the headend device 210 may receive a digital format signal (e.g., CPRI, OBSAI, ORI, eCPRI, etc.) from each of the plurality of BTS 100-1 to 100-n and process the same.

According to another embodiment, the headend device 210 may directly receive and process a baseband signal from each of the plurality of BTS 100-1 to 100-n.

Each of the remote devices 220a, 220b, 220c, and 220d may separate received coupled signals for each frequency band and perform signal processing such as amplification. Accordingly, each of the remote devices 220a, 220b, 220c, and 220d may transmit a base station signal to a user terminal in its service coverage through a service antenna (not shown).

The remote device 220a and the remote device 220b may be connected to each other through an RF cable, an optical cable, a twist cable, a UTP cable, or wireless communication, and a plurality of remote devices may be connected to each other in a cascade structure or a tree structure if necessary.

The extension device 230a may transmit the distributed coupled signal to the remote device 220c connected to the extension device 230a.

The extension device 230b is connected to one end of the remote device 220a and may receive a signal received from the headend device 210 through the remote device 220a in downlink communication. The extension device 230b may transmit the received signal back to the remote device 220d connected to a rear end of the extension device 230b.

Although FIG. 1 shows that the plurality of BTS 100-1 to 100-n and the headend device 210 are connected to each other by wire and are connected to each other through an optical cable at a lower end of the headend device 210 except for the remote device 220a and the remote device 220b, a signal transport medium or a communication method between each node may vary.

For example, at least one of between the headend device 210 and the extension device 230a, between the headend device 210 and the remote device 220a, and between the extension devices 230a and 230b and the remote devices 220c and 220d may be connected through an RF cable, a twisted cable, a UTP cable or the like in addition to the optical cable.

However, the following description will be made with reference to FIG. 1. Therefore, in the DAS 200, the headend device 210, the remote devices 220a, 220b, 220c, and 220d, and the extension devices 230a and 230b may include an optical transceiver module for transmitting and receiving optical signals through electro-optical conversion/photo-electric conversion, and may further include a wavelength division multiplexing (WDM) device when nodes are connected to each other by a single optical cable.

The DAS 200 may be connected to an external management device (not shown) such as a network management server (NMS) 300 or a network operation center (NOC) (not shown) via a network. Accordingly, an administrator may remotely monitor the status and problem of each node of the DAS 200, and may remotely control the operation of each node.

Figure 2:
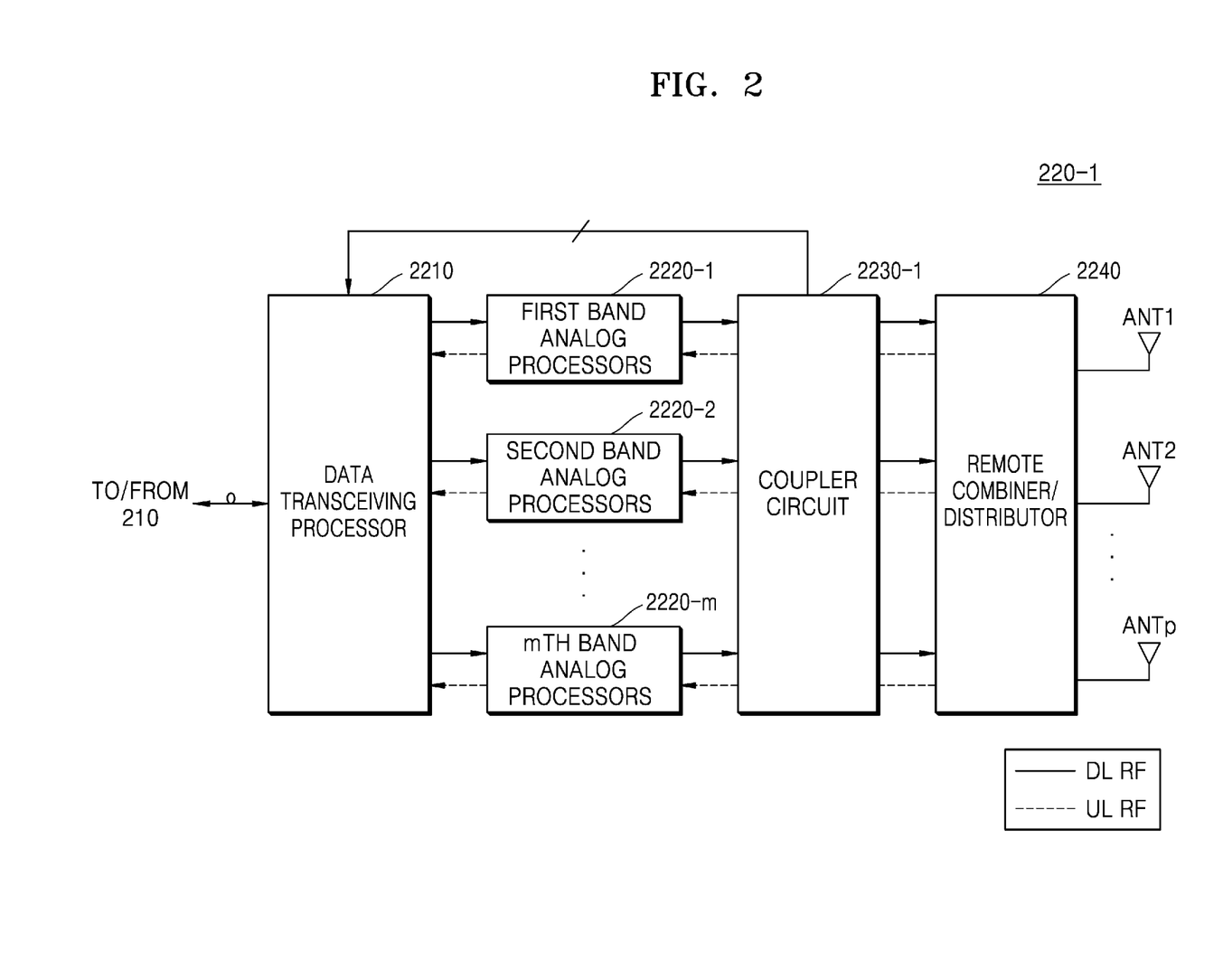
FIG. 2 is a block diagram of a remote device in FIG. 1 according to an embodiment.

FIG. 2 is a block diagram of a remote device in FIG. 1 according to an embodiment.

Referring to FIGS. 1 and 2, a remote device 220-1 may include a data transceiving processor 2210, a plurality of band analog processors 2220-1 to 2220-m, a coupler circuit 2230-1, and a remote combiner/distributor 2240.

The data transceiving processor 2210 may interface a communication signal transmitted/received between the remote device 220-1 and the headend device 210 and perform digital processing on the communication signal.

According to an embodiment, the data transceiving processor 2210 may be referred to as a remote data transmission unit (RDTU) or the like.

Detailed configuration and operation of the data transceiving processor 2210 will be described later with reference to FIG. 3.

Each of the plurality of band analog processors 2220-1 to 2220-m may perform analog processing on uplink communication signals or downlink communication signals for each divided frequency band. For example, the first band analog processor 2220-1 may perform analog processing on an uplink communication signal or a downlink communication signal in a first frequency band, and the second band analog processor 2220-2 may perform analog processing on an uplink communication signal or a downlink communication signal in a second frequency band. In this case, the first frequency band and the second frequency band may be different frequency bands.

According to an embodiment, each of the plurality of band analog processors 2220-1 to 2220-m may perform analog processing such as gain adjustment, frequency up/down conversion, and power amplifying of uplink communication signals on uplink communication signals or downlink communication signals for each frequency band.

The coupler circuit 2230-1 may couple uplink communication signals received from the plurality of band analog processors 2220-1 to 2220-m to the remote combiner/distributor 2240, and may feed back the coupled uplink communication signals to the data transceiving processor 2210.

According to an embodiment, the coupler circuit 2230-1 may selectively feed back at least one of the uplink communication signals received from the plurality of band analog processors 2220-1 to 2220-m to the remote combiner/distributor 2240 to the data transceiving processor 2210.

According to an embodiment, the coupler circuit 2230-1, which is arranged at a front end of the remote combiner/ distributor 2240, may couple downlink communication signals input to the remote combiner/distributor 2240 for distributing downlink communication signals subjected to analog signal processing to antennas ANT1 to ANTP, and may feed back the coupled downlink communication signals to the data transceiving processor 2210.

The remote combiner/distributor 2240 may distribute downlink communication signals received from the plurality of band analog processors 2220-1 to 2220-*m* to the plurality of antennas ANT1 to ANTp, respectively.

According to an embodiment, the remote combiner/distributor 2240 may combine at least some of the downlink communication signals received from the plurality of band analog processors 2220-1 to 2220-*m*, and may distribute the combined signals to the plurality of antennas ANT1 to ANTp, respectively.

The remote combiner/distributor 2240 may distribute uplink communication signals received from the plurality of antennas ANT1 to ANTp to the plurality of band analog processors 2220-1 to 2220-*m*, respectively.

According to an embodiment, the remote combiner/distributor 2240 may combine at least some of the uplink communication signals received from the plurality of antennas ANT1 to ANTP and may distribute the combined signals to the plurality of band analog processors 2220-1 to 2220-*m*, respectively.

According to an embodiment, the remote combiner/distributor 2240 may include a multiplexer.

According to an embodiment, the number (m) of the plurality of band analog processors 2220-1 to 2220-*m* and the number (p) of the plurality of antennas ANT1 to ANTP may be the same or different from each other.

Figure 3:
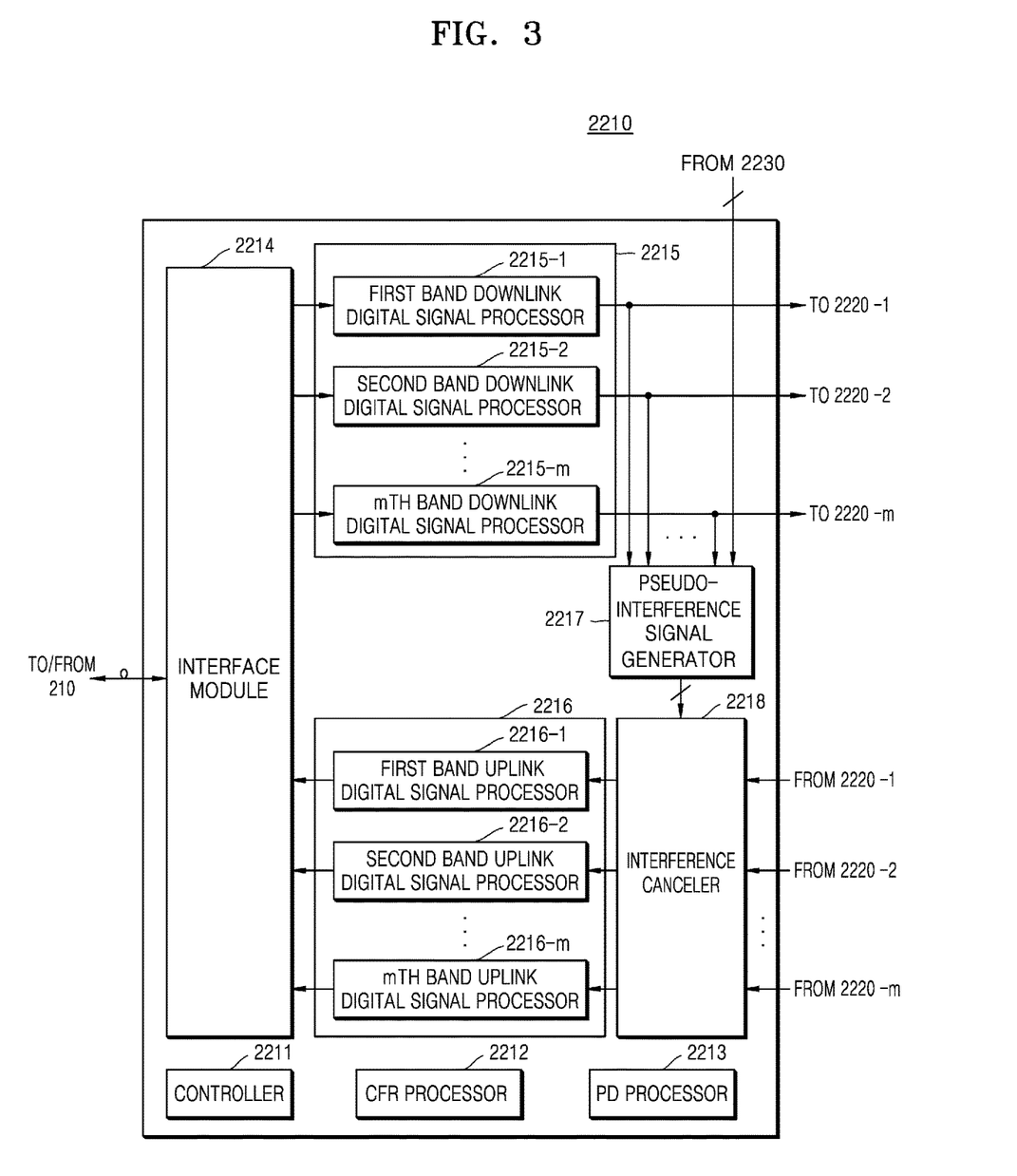
FIG. 3 is a block diagram of a data transceiving processor in FIG. 2 according to an embodiment.

FIG. 3 is a block diagram of the data transceiving processor 2210 in FIG. 2 according to an embodiment.

Referring to FIGS. 2 and 3, the data transceiving processor 2210 may include a controller 2211, a crest factor reduction (CFR) processor 2212, a pre-distortion (PD) processor 2213, an interface module 2214, a downlink digital signal processor 2215, an uplink digital signal processor 2216, a pseudo-interference signal generator 2217, and an interference canceler 2218.

The controller 2211 may control all operations of components included in the data transceiving processor 2210.

The CFR processor 2212 may perform crest factor reduction processing on a digitized downlink communication signal. The crest factor reduction processing may be performed using, for example, peak cancellation-crest factor reduction (PC-CFR).

The PD processor 2213 may perform pre-distortion processing to compensate for linearity during signal amplification on the downlink communication signal subjected to the crest factor reduction processing.

The interface module 2214 may perform necessary interfacing in a process of transmitting and receiving an uplink communication signal or a downlink communication signal with the headend device 210.

The downlink digital signal processor 2215 may include a plurality of band downlink digital signal processors 2215-1 to 2215-*m*. Each of the plurality of band downlink digital signal processors 2215-1 to 2215-*m* may perform digital processing on downlink communication signals of different frequency bands.

The uplink digital signal processor 2216 may include a plurality of band uplink digital signal processors 2216-1 to 2216-*m*. Each of the plurality of band uplink digital signal processors 2216-1 to 2216-*m* may perform digital processing on uplink communication signals of different frequency bands.

In FIG. 3, the plurality of band downlink digital signal processors 2215-1 to 2215-*m* and the plurality of band uplink digital signal processors 2216-1 to 2216-*m* are shown in a separate form, but may be implemented in a form of functions within one processor according to an embodiment.

The pseudo-interference signal generator 2217 may receive downlink communication signals fed back from a coupler circuit 2230 and a downlink communication signal that is subjected to digital signal processing and output by the downlink digital signal processor 2215. The downlink communication signal subjected to digital signal processing and output by the downlink digital signal processor 2215 may be a downlink communication signal before analog signal processing by the band analog processors 2220-1 to 2220-*m* at a rear end of the data transceiving processor 2210.

The pseudo-interference signal generator 2217 may generate signal modification information according to a comparison result of the fed-back downlink communication signals and the downlink communication signal before analog signal processing.

Also, the pseudo-interference signal generator 2217 may generate an interference cancellation signal for canceling interference occurring in an uplink communication signal by a downlink communication signal based on the generated signal modification information.

According to an embodiment, the interference may be passive intermodulation (PIM).

Detailed structure and operation of the pseudo-interference signal generator 2217 will be described later with reference to FIG. 4.

The interference canceler 2218 may receive an interference cancellation signal generated based on signal modification information by the pseudo-interference signal generator 2217.

The interference canceler 2218 may cancel interference occurring in uplink communication signals received from the plurality of band analog processors 2220-1 to 2220-*m* by using the received interference cancellation signal.

According to an embodiment, the data transceiving processor 2210 may further include a digital-to-analog converter (DAC) (not shown) for converting digital-to-analog downlink signals subjected to digital signal processing by the downlink digital signal processor 2215 and an analog-to-digital converter (ADC) (not shown) for converting analog-to-digital uplink signals subjected to analog signal processing by the plurality of band analog processors 220-1 to 2220-*m*.

According to an embodiment, the controller 2211 may receive information about a frequency band in which interference has occurred from the pseudo-interference signal generator 2217 or the interference canceler 2218, and may detect a frequency band in which interference has occurred.

According to an embodiment, the controller 2211 may transmit a control signal to a coupler circuit 2230-1 of FIG. 2 so that a downlink communication signal subjected to analog signal processing may be fed back only for a frequency band in which interference has occurred.

According to an embodiment, the controller 2211 may control at least one of the pseudo-interference signal generator 2217 and the interference canceler 2218 so that interference occurring in an uplink communication signal may be canceled only for a frequency band in which interference has occurred.

Figure 4:
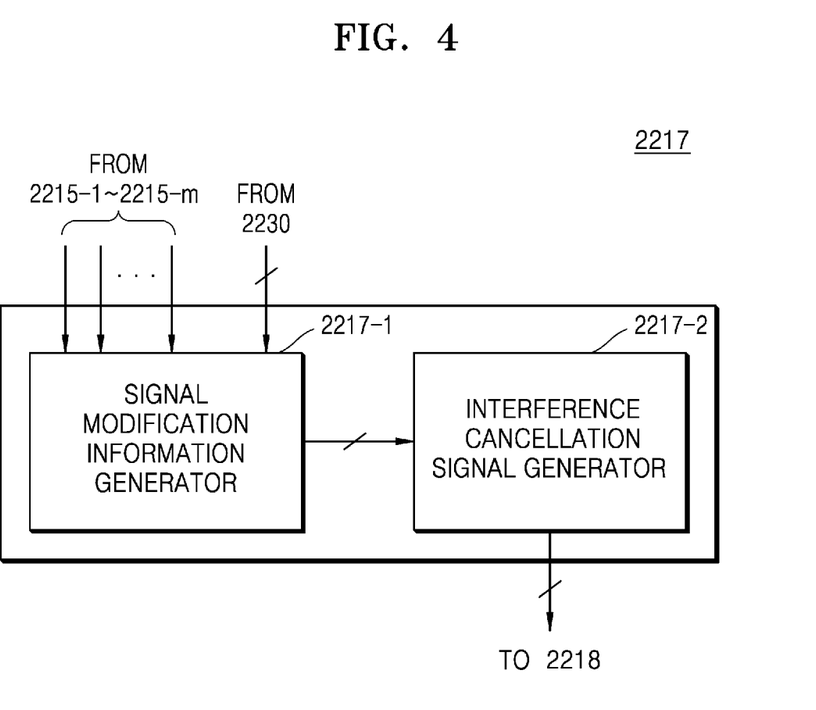
FIG. 4 is a block diagram of a pseudo-interference signal generator in FIG. 3 according to an embodiment.

FIG. 4 is a block diagram of the pseudo-interference signal generator 2217 in FIG. 3 according to an embodiment.

Referring to FIGS. 3 and 4, the pseudo-interference signal generator 2217 may include a signal modification information generator 2217-1 and an interference cancellation signal generator 2217-2.

The signal modification information generator 2217-1 may receive a plurality of downlink communication signals output by the plurality of band downlink digital signal processors 2215-1 to 2215-m and a downlink communication signal subjected to analog signal processing and fed back from the coupler circuit 22230-1.

According to an embodiment, the signal modification information generator 2217-1 may converted the fed-back downlink communication signal into a frequency domain (e.g., fast fourier transform (FFT)), and may calculate a correlation between the fed-back downlink communication signal converted into the frequency domain and a downlink communication signal before analog signal processing. The signal modification information generator 2217-1 may generate signal modification information based on the calculated correlation.

The signal modification information may broadly mean information in which a downlink communication signal is modified during analog signal processing, after the downlink communication signal is subjected to digital signal processing by the data transceiving processor 2210 and then converted into analog.

According to an embodiment, the signal modification information may include at least one of signal flatness and group delay.

The signal modification information generator 2217-1 may transmit the generated signal modification information to the interference cancellation signal generator 2217-2.

The interference cancellation signal generator 2217-2 may receive the signal modification information received from the signal modification information generator 2217-1, and may reflect the signal modification information to generate an interference cancellation signal.

According to an embodiment, the interference cancellation signal generator 2217-2 may compensate for a signal change of a downlink communication signal before analog signal processing based on the signal modification information, and may generate an interference cancellation signal using the downlink communication signal for which the signal change is compensated.

For example, the interference cancellation signal generator 2217-2 may compensate for a value corresponding to the inverse of the signal modification information for the downlink communication signal when compensating for a signal change of the downlink communication signal before analog signal processing.

According to an embodiment, the interference cancellation signal generator 2217-2 may compensate for signal flatness and group delay by using a finite impulse response filter (FIR).

Figure 5:
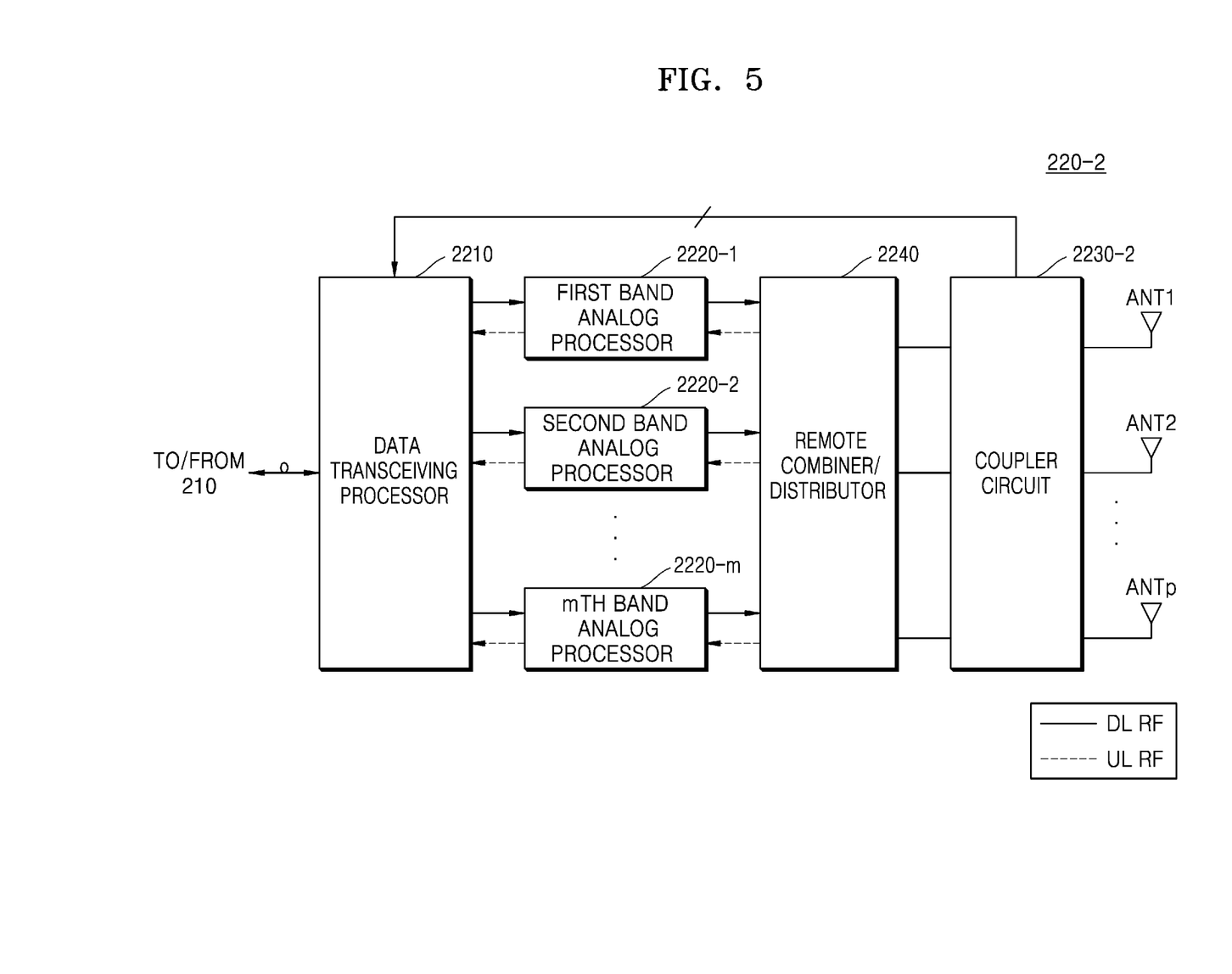
FIG. 5 is a block diagram of a remote device in FIG. 2 according to another embodiment.

FIG. 5 is a block diagram of the remote device 220-2 in FIG. 2 according to another embodiment.

Referring to FIGS. 2 to 5, the remote device 220-2 of FIG. 5 has substantially the same structure and operation as the remote device 220-1 of FIG. 3, except that the position of a coupler circuit 2230-2 is different.

The coupler circuit 2300-2, which is arranged at a rear end of the remote combiner/distributor 2240, may couple downlink communication signals output from the remote combiner/distributor 2240 for distributing downlink communication signals subjected to analog signal processing to the antennas ANT1 to ANTP, and may feed back the coupled downlink communication signals to the data transceiving processor 2210.

Figure 6:
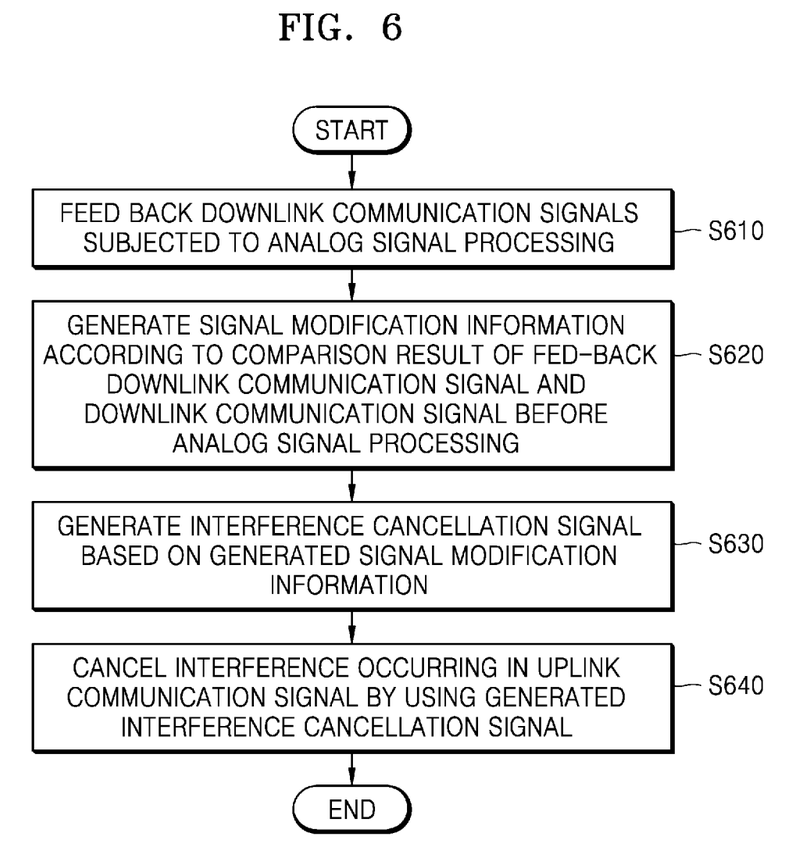
FIG. 6 is a flowchart of a method of operating a communication device according to an embodiment.

FIG. 6 is a flowchart of a method of operating a communication device according to an embodiment.

Referring to FIGS. 1 to 6, in operation S610, a communication device (e.g., 220-1 or 220-2) may feed back downlink communication signals subjected to analog signal processing.

According to an embodiment, a communication device (e.g., 220-1) may couple downlink communication signals input to a remote combiner/distributor (e.g., 2240) for distributing downlink communication signals subjected to analog signal processing to antennas (e.g., ANT1 to ANTP), and may feed back the coupled downlink communication signals to a data transceiving processor (e.g., 2210).

According to an embodiment, a communication device (e.g., 220-2) may couple downlink communication signals output from a remote combiner/distributor (e.g., 2240) for distributing downlink communication signals subjected to analog signal processing to antennas (e.g., ANT1 to ANTP), and may feed back the coupled downlink communication signals to a data transceiving processor (e.g., 2210).

In operation S620, the communication device (e.g., 220-1 or 220-2) may generate signal modification information according to a comparison result of a fed-back downlink communication signal and a downlink communication signal before analog signal processing.

According to an embodiment, the communication device (e.g., 220-1 or 220-2) may generate signal modification information according to a correlation between a fed-back downlink communication signal and a downlink communication signal before analog processing in a frequency band.

In operation S630, the communication device (e.g., 220-1 or 220-2) may generate an interference cancellation signal based on the generated signal modification information.

According to an embodiment, the communication device (e.g., 220-1 or 220-2) may compensate for a signal change of a downlink communication signal before analog signal processing based on signal modification information, and may generate an interference cancellation signal using the downlink communication signal for which the signal change is compensated.

In operation S640, the communication device (e.g., 220-1 or 220-2) may cancel interference occurring in an uplink communication signal by using the interference cancellation signal generated in operation S630.

According to an embodiment, the communication device (e.g., 220-1 or 220-2) may cancel interference occurring in uplink communication signals received from the plurality of band analog processors (e.g., 2220-1 to 2220-m) by using an interference cancellation signal.

The communication devices and methods of operation thereof according to an embodiment may perform more precise interference cancellation processing by feeding back a downlink communication signal subjected to analog signal processing and generating an interference cancellation signal based on signal modification information of the fed-back downlink communication signal.

What is claimed is:

1. A method of operating a communication device including a processor and a memory, the method comprising:
feeding back a downlink communication signal subjected to analog signal processing;
generating signal modification information according to a comparison result of the fed-back downlink communication signal and a downlink communication signal before the analog signal processing;

generating an interference cancellation signal for canceling interference occurring in an uplink communication signal by the downlink communication signal based on the generated signal modification information; and canceling interference occurring in the uplink communication signal by using the generated interference cancellation signal.

2. The method of claim 1, wherein the interference is passive intermodulation (PIM).

3. The method of claim 1, wherein the feeding back of the downlink communication signal subjected to analog signal processing comprises:

feeding back a downlink communication signal input to a distributor for distributing the downlink communication signal subjected to analog signal processing to an antenna of the communication device.

4. The method of claim 1, wherein the feeding back of the downlink communication signal subjected to analog signal processing comprises:

feeding back a downlink communication signal output from a distributor for distributing the downlink communication signal subjected to analog signal processing to an antenna of the communication device.

5. The method of claim 1, wherein the generating of the signal modification information comprises:

converting the fed-back downlink communication signal into a frequency domain;

calculating a correlation between the fed-back downlink communication signal converted into the frequency domain and a downlink communication signal before the analog signal processing; and generating the signal modification information based on the calculated correlation.

6. The method of claim 5, wherein the signal modification information includes at least one of signal flatness and group delay.

7. The method of claim 1, wherein the generating of the interference cancellation signal comprises:

compensating for a signal change of a downlink communication signal before the analog signal processing based on the signal modification information; and generating the interference cancellation signal using the downlink communication signal for which the signal change is compensated.

8. The method of claim 7, wherein the compensating for the signal change of the downlink communication signal comprises:

compensating for a value corresponding to the inverse of the signal modification information with respect to the downlink communication signal.

9. The method of claim 8, wherein the compensating for the signal change of the downlink communication signal comprises:

compensating for signal flatness and group delay using a finite impulse response (FIR) filter.

10. The method of claim 1, further comprising:

detecting a frequency band in which interference has occurred.

11. The method of claim 10, wherein the feeding back of the downlink communication signal subjected to analog signal processing comprises:

selectively feeding back a downlink communication signal subjected to analog signal processing for the frequency band in which interference has occurred.

12. The method of claim 10, wherein the canceling of interference occurring in the uplink communication signal comprises:

selectively canceling interference occurring in the uplink communication signal for the frequency band in which interference has occurred.

13. The method of claim 1, wherein the communication device is a remote device included in a distributed antenna system.

14. The method of claim 13, wherein the method of operating a communication device is digitally processed in the remote device.

15. A communication device including a processor and a memory, the communication device comprising:

a signal modification information generator configured to feed back a downlink communication signal subjected to analog signal processing and to generate signal modification information according to a comparison result of the fed-back downlink communication signal and a downlink communication signal before the analog signal processing;

an interference cancellation signal generator configured to generate an interference cancellation signal for canceling interference occurring in an uplink communication signal by the downlink communication signal based on the generated signal modification information; and an interference canceler configured to cancel interference occurring in the uplink communication signal by using the generated interference cancellation signal.

\* \* \* \* \*